(No Model.)
J. W. HALL.
WHEEL FOR VELOCIPEDES.
No. 447,822. Patented Mar. 10, 1891.
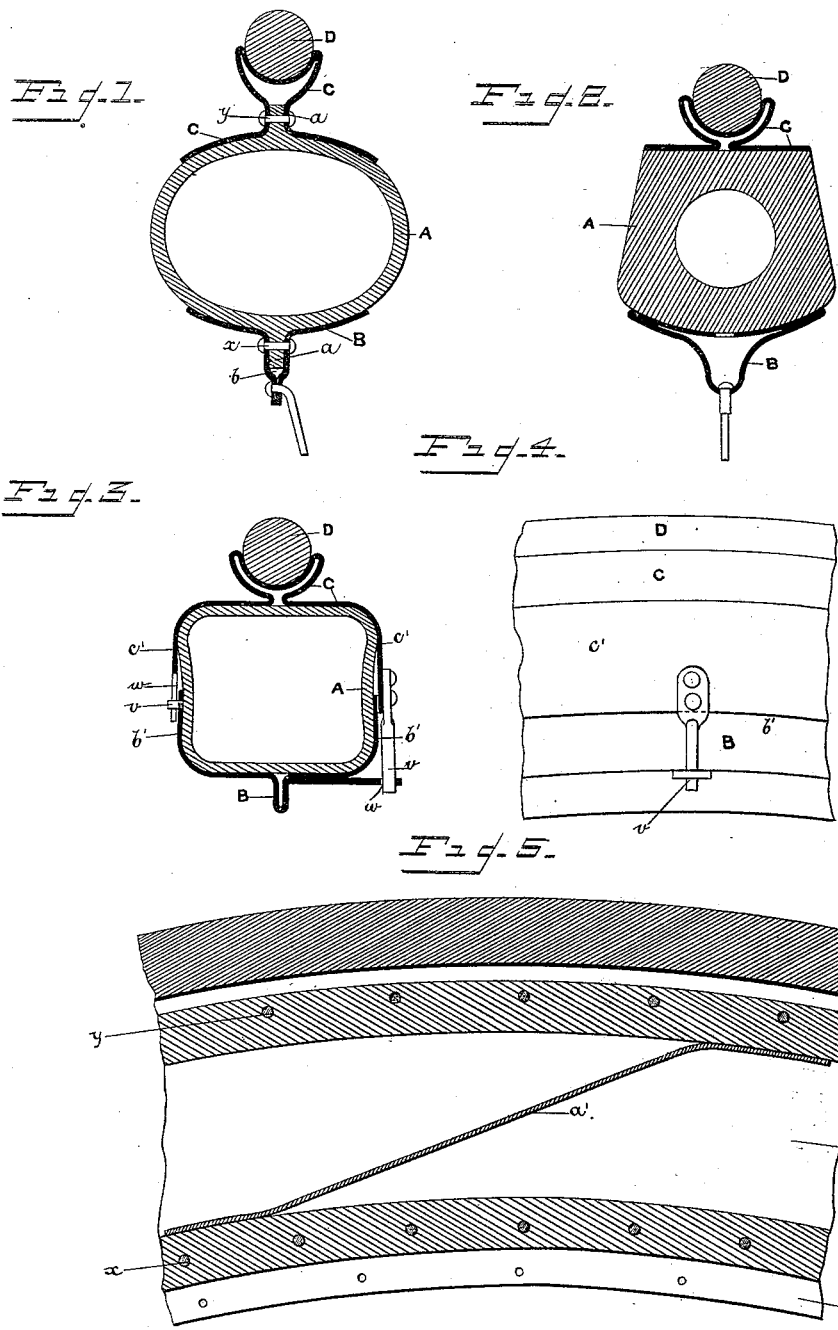
WITNESSES:
Arthur M. Flack.
Edward C. Hammond.
INVENTOR.
John William Hall.
By his Attorney.
Robt. Ed. Phillips.

UNITED STATES PATENT OFFICE.

JOHN WILLIAM HALL, OF WHITEHAVEN, ENGLAND.

WHEEL FOR VELOCIPEDES.

SPECIFICATION forming part of Letters Patent No. 447,822, dated March 10, 1891.

Application filed October 4, 1890. Serial No. 367,071. (No model.) Patented in England December 13, 1889, No. 20,108.

*To all whom it may concern:*

Be it known that I, JOHN WILLIAM HALL, a subject of the Queen of Great Britain, residing at Whitehaven, in the county of Cumberland, England, have invented certain new and useful Improvements in Wheels for Velocipedes and other Vehicles, (for which I have obtained a patent in Great Britain, dated December 13, 1889, and numbered 20,108,) of which the following, taken in conjunction with the accompanying drawings, is a full, clear, and exact description of same.

My invention relates to improvements in wheels for velocipedes and other vehicles; and it consists in fixing the tire in a metal rim, between which rim and an inner metal rim adapted to receive the spokes of the wheel is an annular elastic cushion, preferably of rubber and in the form of an annular tube, which may, if desired, be inflated or filled with air, water, or other fluid, the object being the reduction of vibration in the velocipede or other vehicle.

I carry my invention into effect in the manner described herein and illustrated by the accompanying drawings, forming part hereof, in which—

Figure 1 is a view in transverse section of the annular elastic hollow cushion and the inner and outer metal rims attached thereto, the latter of which carries the tire. Fig. 2 is a similar view in transverse section showing another form my invention may assume. Figs. 3 and 4 are views in transverse section and broken side elevation, respectively, showing a further modification of my invention as designed to afford better protection to the elastic cushion aforesaid; and Fig. 5 is a view in broken longitudinal section of my invention, showing a detail of construction.

Throughout the several views similar parts are marked with like letters of reference.

Referring to Fig. 1 of the accompanying drawings, I take an annular hollow elastic cushion A, formed with longitudinal flanges *a a*. This hollow elastic cushion is fixed to a rim B, having a central depression *b*, adapted to receive one of the flanges *a*, by cementation or vulcanization or by any other suitable means, and either with or without small rivets or screws *x x*, &c., passing transversely through the flange *a*.

To the outer or larger circumference of the annular hollow cushion A is fixed a flanged rim C, adapted to carry an ordinary tire D, of rubber or other suitable substance or material, and to receive the other flange *a* of the hollow cushion A. The rim C is fixed to the hollow cushion A in any suitable manner, but preferably as shown in the drawings, with the small transverse rivets or screws *y y*, &c.

I do not bind myself to the use of tires or rims of any particular shape or construction or to the method employed to obtain the greatest amount of elasticity from the elastic hollow cushion A, which may either be an annular tube formed of rubber or of other suitable substance or material capable, if desired, of being inflated or filled with air, water, or other fluid, in which case it will, preferably, take the form shown by Fig. 1 of the accompanying drawings, or it may be of thicker substance, (but also hollow,) as shown by Fig. 2 of the accompanying drawings.

If desired, the elastic hollow cushion A may be strengthened by the use of sufficiently thick canvas or other suitable material or substance in conjunction therewith. At its connection with the rims it may also be strengthened, if desired, by means of canvas or other suitable material worked into the substance of the elastic cushion.

If it be thought desirable to provide extra lateral support to the hollow elastic cushion, I form projecting flanges *b'* and *c'* on the rims B and C, respectively, adapted to either wholly or partially inclose the cushion A (but not so as to prevent full play to its elasticity in the direction required) and form or fix studs *v* on one rim, adapted to engage with holes or slots *w* in the other rim, as shown by Figs. 3 and 4 of the accompanying drawings.

If the hollow elastic cushion A is wholly inclosed by the rims, as shown in the drawings, Fig. 3, it may be made somewhat lighter.

Another means of preventing excessive circumferential movement between the two rims is to connect them together by a series of drag-links, or to connect the interior surfaces of the cushion A together by a series of flexible links $a'$, made of strong canvas or of other suitable material or substance, and fixed to the interior surfaces of the cushion in any convenient manner, as shown by Fig. 5 of the accompanying drawings.

It will be understood that the inner or smaller diameter of the rim C should be preferably less than the outer diameter of the elastic cushion A, so that a better fit between the two may be obtained when they are properly fitted together.

When my improved wheel is intended to be fitted with wire spokes, as in a velocipede, the inner rim B is fashioned to adapt it to receive the wire spokes in any suitable manner, as shown in Figs. 1 and 2 of the accompanying drawings, and if the elastic hollow cushion A is intended to be inflated or filled with air, water, or other fluid, it will be provided with one or more suitable nozzle-valves for that purpose. In some cases, however, the hollow elastic cushion may be inflated during the process of its manufacture.

Instead of making the hollow elastic cushion in a continuous length and with one chamber, it may be made up of distinct or separate segments, forming separate chambers or cells, or it may be made cellular in one length by means of suitable walls or partitions.

Sometimes instead of having one hollow elastic cushion I prefer to use two or more such cushions, but of smaller diameter, and such cushions may be either inclosed within a larger elastic cushion, or they may be held together by suitable bands or ties placed at different portions of their length, or by other suitable means.

I wish it to be particularly understood that I do not bind myself to the precise details of construction herein set forth, and shown by the accompanying drawings, but hold myself at liberty to make such changes and alterations therein as fairly fall within the spirit and scope of my invention.

Having now particularly described and ascertained the nature of my said invention and in what manner the same is to be performed, I declare that what I claim is—

1. In a wheel for velocipedes and other vehicles, the combination of an annular hollow elastic cushion attached at its inner or smaller circumference to a metal rim adapted to receive the spokes, with another metal rim adapted to carry the tire and attached to the outer or larger circumference of the hollow elastic cushion, substantially as herein described, and illustrated in the accompanying drawings.

2. In a wheel for velocipedes and other vehicles, the combination of a hollow elastic cushion having one or more annular chambers adapted to be filled with air, water, or other fluid under compression and attached at its inner or smaller circumference to a metal rim adapted to receive the spokes, with another metal rim adapted to carry the tire, and which rim is attached to the outer or larger circumference of the hollow elastic cushion, substantially as herein described and shown.

3. In a vehicle-wheel, the combination of the main rim B, of the hollow elastic cushion A, and of the rim C with the tire D, all combined, arranged, and operating as set forth.

4. In a vehicle-wheel, the combination of the main rim B, of the hollow elastic cushion A, with circumferential flanges $a$ $a$, and of the rim C with the tire D, all constructed, arranged, and operating as and for the purpose set forth.

5. In a vehicle-wheel, the combination of the main rim B, having circumferential flanges $b'$ $b'$, of the rim C, having circumferential flanges $c'$ $c'$, of the hollow elastic cushion A, and of the tire D, all combined, arranged, and operating as and for the purpose set forth.

6. In a vehicle-wheel, the combination of the main rim B, having circumferential flanges $b'$ $b'$, of the rim C, having circumferential flanges $c'$ $c'$, adapted to slide over the flanges $b'$ $b'$ of the rim B, of the studs $v$ $v$, engaging with the holes or slots $w$ $w$, of the hollow elastic cushion A, and of the tire D, all constructed, arranged, and operating as and for the purpose set forth.

7. In a vehicle-wheel, the combination of the main rim B, of the rim C, of the tire D, of the hollow elastic cushion A, and of the flexible links $a'$ $a'$, all combined, arranged, and operating as and for the purpose set forth.

In witness whereof I have hereunto signed my name in the presence of two subscribing witnesses.

JOHN WILLIAM HALL.

Witnesses:
ROBT. ED. PHILLIPS,
EDWARD C. HAMMOND.